UNITED STATES PATENT OFFICE.

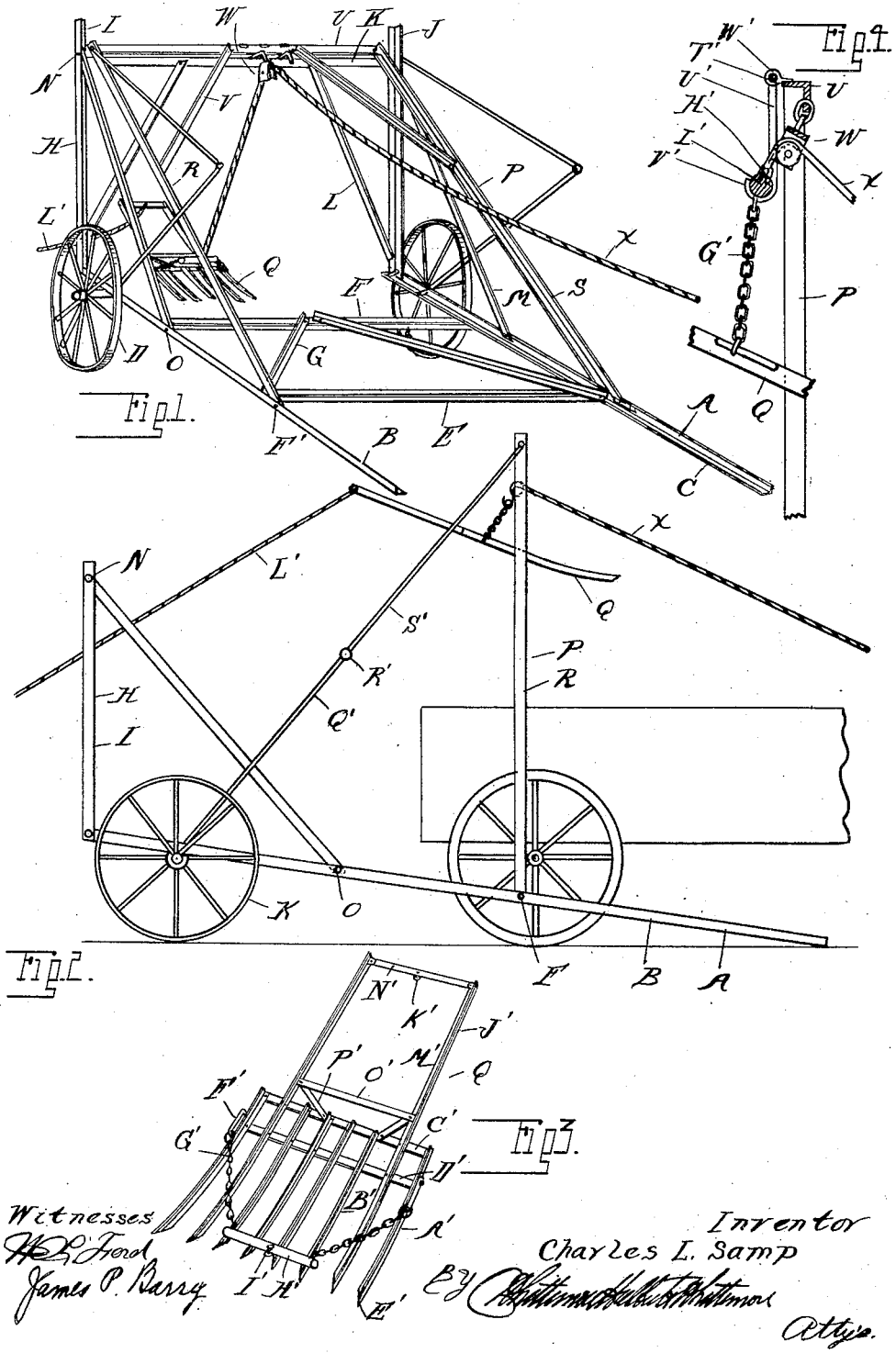

CHARLES L. SAMP, OF DETROIT, MICHIGAN.

WAGON-LOADER.

1,109,789.  Specification of Letters Patent.  Patented Sept. 8, 1914.

Application filed December 20, 1913. Serial No. 807,868.

*To all whom it may concern:*

Be it known that I, CHARLES L. SAMP, a citizen of the United States of America, residing at Detroit, in the county of Wayne and State of Michigan, have invented certain new and useful Improvements in Wagon-Loaders, of which the following is a specification, reference being had therein to the accompanying drawings.

My invention relates to wagon loaders and has among the objects thereof to provide an improved construction of loader which may be readily used in connection with the ordinary wagon and which utilizes the power of the team both for gathering the load and for hoisting the same into the wagon; to provide a simple and efficient loader that may be easily and cheaply manufactured and which is not liable to get out of order; and further to provide a portable loader that may be readily attached or detached from the wagon.

Other objects of the invention will more fully hereinafter appear.

In the drawings,—Figure 1 is a perspective view of the device embodying the invention; Fig. 2 is a side elevation, showing the parts in a different position of adjustment; Fig. 3 illustrates the load-gathering implement; and Fig. 4 illustrates a detail of construction.

A designates the main frame of the loader, composed of spaced side-bars B C, and D are wheels attached to the side-bars B C adjacent the rear ends of the latter.

E F are cross-bars suitably attached to the side-bars and G are diagonal braces each connected at one end to a side-bar and having its opposite end attached to the cross-bar F. Projecting upwardly from the rear end of the main frame A is a frame H comprising standards I J attached adjacent their lower ends to the side-bars B C, and a cross-connecting bar K rigidly attached to the members I J adjacent the upper ends of the latter.

L are braces having their opposite ends respectively connected to the cross-bars and to the cross-connecting bar K, and M are diagonal braces for the standards I J, each having one end attached thereto as at N and having the opposite end connected to the side-bar as at O.

Pivoted forwardly of the frame H is a swinging frame P which carries the load-gathering implement Q. The frame P is herein shown as formed of uprights R and S, the lower ends of which are pivoted at F' to the side-bars and the upper ends of which are rigidly connected together by a cross-bar U. Preferably the latter is reinforced by diagonal braces V extending between the member U and the uprights. Arranged centrally of the member U is a sheave W over which passes the cable X that is connected to the implement Q, this cable leading forwardly of the main frame for a considerable distance, in order that it may be attached to the draft connection of the horses.

The construction of the implement Q will of course, vary in accordance with the material to be loaded. In the drawings I have illustrated the implement as constructed for loading manure. Thus A' designates the body of the implement, composed of a plurality of spaced tines B' connected at their rear ends to a cross-bar C' and also preferably reinforced by an integral cross-bar D'. The lower or forward ends E' of the tines are pointed. Secured to the outer tines are bail-shaped members F' to which are connected the ends of chains G'. The opposite ends of these chains are attached to a member H' provided centrally thereof with a bearing I' to which one end of the cable X is secured.

J' is a handle for the implement which extends rearwardly therefrom and is provided at its outer end with a bearing K' for receiving the tripping and guiding cable L'. The handle J' is preferably formed by spaced members M' connected at their outer ends by a cross-bar N' which carries the bearing K'. The members M' are shown herein as formed of integral extensions of two of the tines, but are preferably braced adjacent the bearing C' by a cross-connection O' and diagonal braces P'.

As will be seen upon reference to Fig. 3, the tines and also the member M' are formed of angle-shaped metallic bars, thereby providing an extremely strong but comparatively light structure. Similarly I find it desirable to construct the various parts of the frames A, H and P, as well as the braces thereof, of angle iron.

Normally the frame P is in the position shown in Fig. 1, the uprights R S resting adjacent their outer ends upon the cross-bar K. When force is applied to the cable X to draw the same forward, the operator guides the implement by means of the handle J' to cause the latter to engage the material to be loaded. A further movement will cause the lifting of the implement until the member H' engages the sheave. During this lifting the implement is held in horizontal position by the operator through the means of the cable L'. When the member H' engages the sheave further movement of the cable X will cause the frame P to swing upwardly and forwardly over the wagon, as shown in Fig. 2. When the frame P has reached the desired position, the implement may be tripped by releasing the cable L'. Forward swinging movement of the frame P is limited by means of a connection composed of rods Q' S' respectively attached at their outer ends to the uprights of the frame P and to the side-bars of the main frame and having their inner ends provided with inter-engaging eyes R' permitting the folding of the members Q' S' when the frame P is in the position shown in Fig. 1.

When the implement is raised to a position in which the member H' engages the sheave, it is prevented from returning independently of the frame P by a locking or retaining device T', which is herein illustrated as composed of arms U' arranged respectively upon opposite sides of the sheave and having the hook-shaped ends V' adapted to engage the member H', as shown in Fig. 2. These arms are pivotally connected at their upper ends, as indicated at W', to the cross-bar U.

When the parts are as shown in Fig. 2 and it is desired to return the frame P to the position shown in Fig. 1, it is merely necessary for the operator to pull upon the cable L', since the implement is secured to the frame P through the device T. However, when the frame P engages the support H the cross-bar K will engage the arms U' and rock the same forward to the position shown in Fig. 1, which will disengage the member H' from the hook-shaped portion V'.

While I have illustrated and described the preferred form of my invention, I do not desire to limit my protection to the exact construction shown in the drawings, but consider the invention broad enough to embody necessary and obvious changes.

What I claim as my invention is:—

1. A wagon loader, comprising a main frame, traction wheels secured to said frame, a swinging frame carried by the main frame, an upwardly-extending frame attached to the main frame and adapted to support said swinging frame in an inclined position, a sheave carried by the swinging frame, a loading implement, a cable extending through said sheave and attached to said implement, said implement being adapted during the loading movement thereof to initially raise to a predetermined position independently of the swinging frame and to then move as a unit with said swinging frame.

2. The combination with a main frame composed of spaced side bars and cross-connecting members, of a supporting frame composed of standards and a cross-bar connecting the standards adjacent the upper ends of the latter, said supporting frame being connected to the main frame, traction wheels for the main frame, a swinging frame comprising uprights pivotally connected to said side-bars and a cross-bar connecting said uprights, a sheave carried by the swinging frame, a loading implement, a cable passing through said sheave and engaging said implement, means for limiting the forward swinging movement of the swinging frame, the latter being normally supported by said upright frame, and a guide and trip cable connected to said implement.

3. A wagon loader, comprising a main frame, an upright frame, a swinging frame normally supported in an inclined position by said upright frame, an implement, means for raising said implement during the initial loading movement independent of said swinging frame and for then moving said implement and said swinging frame as a unit, and means for locking said implement to the swinging frame.

4. A wagon loader, comprising a main frame, an upright frame, a swinging frame normally supported in an inclined position by said upright frame, an implement, means for raising said implement during the initial loading movement independent of said swinging frame and for then moving said implement and said swinging frame as a unit, and means for locking said implement to said swinging frame, said locking means being arranged to automatically release said implement when said swinging frame is returned to said inclined position.

5. A wagon loader, comprising a main frame, traction wheels secured to said frame, a swinging frame carried by the main frame, an upright frame normally supporting said swinging frame in an upright position, a sheave carried by the swinging frame adjacent its upper end, a loading implement, a cable passing over said sheave and engaging said implement, said implement during the loading movement being adapted to move independently of said swinging frame until said implement is raised to adjacent the upper end of the swinging frame, there being coöperating bearings upon the swinging frame and implement arresting a further upward movement of the implement and for then causing the implement and swinging frame to move as a unit, and a pivotal member attached to the swinging frame and adapted to have a locking engagement with said implement upon the initial upward movement of said swinging frame.

6. A wagon loader, comprising a main frame, traction wheels secured to said frame, a swinging frame carried by the main frame, an upright frame normally supporting said swinging frame in an upright position, a sheave carried by the swinging frame adjacent its upper end, a loading implement, a cable passing over said sheave and engaging said implement, said implement during the loading movement being adapted to move independently of said swinging frame until said implement is raised to adjacent the upper end of the swinging frame, there being coöperating bearings upon the swinging frame and implement arresting a further upward movement of the implement and for then causing the implement and swinging frame to move as a unit, a pivotal member attached to the swinging frame and adapted to have a locking engagement with said implement upon the initial upward movement of said swinging frame, and means for automatically releasing said implement when said swinging frame is returned to its inclined position.

In testimony whereof I affix my signature in presence of two witnesses.

CHARLES L. SAMP.

Witnesses:
 Wm. J. Belknap,
 James P. Barry.

Copies of this patent may be obtained for five cents each, by addressing the "Commissioner of Patents, Washington, D. C."